US009669911B2

(12) United States Patent
Cigolini et al.

(10) Patent No.: US 9,669,911 B2
(45) Date of Patent: Jun. 6, 2017

(54) REGULATOR HAVING REMOVABLE FIRST STAGE ORIFICE BODY

(71) Applicants: Alessandro Cigolini, Casarza Ligure (IT); Franco Solari, Chiavari (IT); Corrado Cominetti, Cogorno (IT)

(72) Inventors: Alessandro Cigolini, Casarza Ligure (IT); Franco Solari, Chiavari (IT); Corrado Cominetti, Cogorno (IT)

(73) Assignee: Johnson Outdoors Inc., Racine, WI (US)

( * ) Notice: Subject to any disclaimer, the term of this patent is extended or adjusted under 35 U.S.C. 154(b) by 47 days.

(21) Appl. No.: 14/454,444

(22) Filed: Aug. 7, 2014

(65) Prior Publication Data

US 2016/0041563 A1 Feb. 11, 2016

(51) Int. Cl.

| | |
|---|---|
| ***F16K 31/12*** | (2006.01) |
| ***B63C 11/22*** | (2006.01) |
| ***G05D 16/10*** | (2006.01) |
| ***A62B 9/02*** | (2006.01) |
| ***G05D 7/01*** | (2006.01) |

(52) U.S. Cl.

CPC .......... *B63C 11/2227* (2013.01); *A62B 9/022* (2013.01); *G05D 7/01* (2013.01); *G05D 16/10* (2013.01)

(58) Field of Classification Search

CPC ...................................................... A62B 9/022

USPC ............ 137/505.28, 505.27, 505.26, 505.29, 137/505.3, 505.31, 522, 523; 405/186, 405/193

See application file for complete search history.

(56) References Cited

U.S. PATENT DOCUMENTS

| | | | | |
|---|---|---|---|---|
| 1,795,201 A * | 3/1931 | Dashwood | G05D 16/0672 137/385 |
| 3,920,033 A * | 11/1975 | Ferrando | B63C 11/2209 128/204.29 |
| 4,972,868 A | 11/1990 | Davis et al. | |
| 5,097,860 A | 3/1992 | Ferguson et al. | |
| 5,183,075 A | 2/1993 | Stein | |
| 5,381,825 A | 1/1995 | Garraffa | |
| 5,497,803 A | 3/1996 | Ferrante | |
| 5,685,297 A | 11/1997 | Schuler | |
| 5,687,712 A | 11/1997 | Semeia | |
| 6,634,378 B2 | 10/2003 | Semeia | |
| 6,725,861 B1 | 4/2004 | Semeia | |

(Continued)

OTHER PUBLICATIONS

Aqua Lung Service Manual; "First Stage Calypso Yoke / DIN", Rev. Jan. 2004; Copyright 2004 Aqualung France; 18 pages.

(Continued)

*Primary Examiner* — Umashankar Venkatesan

(74) *Attorney, Agent, or Firm* — Reinhart Boerner Van Deuren P.C.

(57) ABSTRACT

A first stage pressure regulator is provided. A valve body has an inlet and an outlet that define a pressure chamber therebetween. The valve body defines a pressure compensation chamber having an opening fluidly communicating the pressure compensation chamber with the surrounding water. The first stage pressure regulator comprises an inlet tubular union removably received into the inlet. A removable high pressure orifice body defines an orifice therethrough. The orifice body is carried by the valve body proximate the inlet. A valve seat is within the valve body.

14 Claims, 2 Drawing Sheets

(56) References Cited

U.S. PATENT DOCUMENTS

| | | | |
|---|---|---|---|
| 7,398,794 | B2 | 7/2008 | Semeia |
| 2004/0011361 | A1 | 1/2004 | Clarke |
| 2007/0144592 | A1 | 6/2007 | Taylor |

OTHER PUBLICATIONS

Cressi-$F_3$ Schematic; known to Applicants at least prior to Apr. 22, 2014.

* cited by examiner

REGULATOR HAVING REMOVABLE FIRST STAGE ORIFICE BODY

FIELD OF THE INVENTION

This invention generally relates to a first stage regulatory valve for use in a self-contained underwater breathing apparatus.

BACKGROUND OF THE INVENTION

First stage pressure regulators for underwater breathing convert high pressure gas to a lower pressure at or near a pressure that can be breathed by a diver. The high pressure gas is generally supplied to the first stage pressure regulator from an outlet of a cylinder of compressed air at a pressure that may be in excess of 4,000 psi.

The high pressure gas is received by the first stage pressure regulator through an orifice of the first stage pressure regulator into a high pressure chamber of the valve body of the first stage pressure regulator. Orifice sizes, hardness, and sealing surfaces contribute to the efficiency and amount of high pressure air passing into the high pressure chamber of the valve body. Heretofore, the high pressure gas has been received into the high pressure chamber of the valve body through an orifice formed into and of the valve body.

Such high pressure receiving orifices that are integral with the valve body have resulted in complex and time consuming machining of the first stage pressure regulating valve body. Additionally, because the orifice is integral with the valve body the hardness of the outer sealing edges of the orifice is limited to the same material and hence the same hardness of the valve body itself. Accordingly, the sealing edge of the orifice has proven difficult to protect from wear. Further, it has been difficult to protect such an integral orifice from corrosion because its location within the valve body makes it difficult to coat with anti-corrosion materials. Still further, quality control of the integral valve body orifice must be done with the valve body itself as opposed to being able to do quality control of the orifice independent of the valve body. Moreover, maintenance of such orifices has proven difficult since its wear is wear of the valve body itself.

The present invention seeks to provide improvements over the current state of the art of first stage pressure regulators for underwater breathing devices. These and other advantages of the invention, as well as additional inventive features, will be apparent from the description of the invention provided herein.

BRIEF SUMMARY OF THE INVENTION

In one aspect, the invention provides a first stage pressure regulator comprising a valve body having an inlet and an outlet that define a pressure chamber between the inlet and an outlet. The valve body defines a pressure compensation chamber having an opening fluidly communicating the pressure compensation chamber with the surrounding water. The first stage pressure regulator comprises an inlet tubular union removably received into the inlet. A removable high pressure orifice body defines an orifice therethrough. The orifice body is carried by the valve body proximate the inlet. A valve seat is within the valve body.

A valve member is slidably carried within the valve body pressure chamber. The valve member has a valve end. The valve seat is carried by the valve end. The valve member is slidable between an open state and a closed state. In the open state the valve end carrying the valve seat is spaced from the removable high pressure orifice permitting fluid flow through the orifice between the inlet and outlet. In the closed state the valve end carrying the valve seat is sealingly seated against the removable high pressure orifice body preventing fluid flow between the inlet and outlet.

In an embodiment, the removable high pressure orifice body may include an upstream end in the form of a T-shaped head having a larger diameter than a downstream end. The orifice body may extend downstream of the T-shaped head into the inlet.

In another embodiment, a bottom surface of the T-shaped head is seated upon an outward facing surface of the inlet of the valve body. A top surface of the T-shaped head is in contact with the inlet tubular union such that the tubular union secures the orifice body in the inlet.

In an embodiment, the T-shaped head may fit inside a cavity at a distal end of the inlet tubular union. The T-shaped head may include a slot that fluidly communicates a high pressure passage surrounding the T-shaped head with a center passage of the inlet tubular union. The high pressure passage is in fluid communication with a high pressure exit port of the valve body.

In an embodiment, a head of the removable high pressure orifice body is inside a cavity formed in a distal end of the inlet tubular union.

In another embodiment, a T-shaped head of the high pressure orifice body is dimensioned to fit within a cavity of the inlet tubular union.

In yet another embodiment, the orifice body is axially movable and the inlet tubular union limits axial motion of the orifice body.

In another embodiment, an end of the removable high pressure orifice body is in sealing contact with the valve seat in the closed state.

In yet another embodiment, the valve body comprises a material of a first hardness and the removable high pressure orifice is comprised of a material of a second hardness greater than the first hardness.

In still another embodiment, the removable high pressure orifice body generally includes a T-shaped head at an upstream end; a conical protrusion at a downstream end; a slot formed into a top surface of the T-shaped head; an annular groove formed into the valve body proximate an axial center of the orifice body. The annular groove receives an O-ring; the O-ring is in sealing contact with walls of the inlet of the valve body. The conical protrusion terminates at a tip; the tip is in sealing contact with the valve seat in the closed state.

In another embodiment the removable high pressure orifice is free of fastening threads.

In yet another embodiment the compensation chamber includes an insulated bushing; an insulating ring an insulating sleeve and an insulating biasing member.

In another aspect, the invention provides a method of assembly of a first stage pressure regulator. The method includes seating a removable high pressure orifice that defines an orifice in an inlet of a valve body. The method includes securing an inlet tubular union to the valve body to limit axial motion of the orifice body within the inlet between the inlet tubular union and the valve body.

In an embodiment, the valve body has an inlet and an outlet and that define a pressure chamber between the inlet and an outlet. The valve body defines a pressure compensation chamber having an opening fluidly communicating the pressure compensation chamber with the surrounding water.

The valve body includes a valve seat within the valve body. A valve member is slidably carried within the valve body pressure chamber and has a valve end and an expansion head connected to the valve end. The valve member is slidable between an open state and a closed state. In the open state the valve end carrying the valve seat is spaced from a downstream end of the removable high pressure orifice permitting fluid flow between the inlet and outlet. In a closed state the valve end carrying the valve seat is sealingly seated against the downstream end of the removable high pressure orifice preventing fluid flow between the inlet and outlet. The expansion head is exposed to the pressure compensation chamber and is operably acted upon by the surrounding water within the pressure compensation chamber to bias the valve member toward the open state. A biasing member is carried within the compensation chamber to bias the valve member towards the open state.

The removable high pressure orifice body of the method may include a T-shaped head at an upstream end, a conical protrusion at a downstream end, a slot formed into a top surface of the T-shaped head, a central passage through the valve body and an annular groove formed into the valve body at approximate a longitudinal center of the orifice body.

In an embodiment, the step of securing is threading.

In another embodiment, the step of securing includes receiving a head of the removable high pressure orifice body in a cavity in a distal end of the inlet tubular union.

In yet another aspect, the invention provides a method of servicing a first stage pressure regulator. The method comprises removing a removable high pressure orifice body from an inlet of a valve body. The method includes modifying the removable high pressure orifice body and includes the step of reinserting the repaired orifice body into and on the inlet of the valve body.

In an embodiment, the step of modifying the removable high pressure orifice body may include machining a new diameter of a flow restriction orifice of the removable high pressure orifice body that is of greater diameter than an original diameter of the flow restriction orifice.

In yet another embodiment, the step of securing fixes the orifice body within the inlet between the inlet tubular union and the valve body.

In yet another embodiment, the step of modifying may include replacing the removable high pressure orifice body with a second removable high pressure orifice body.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
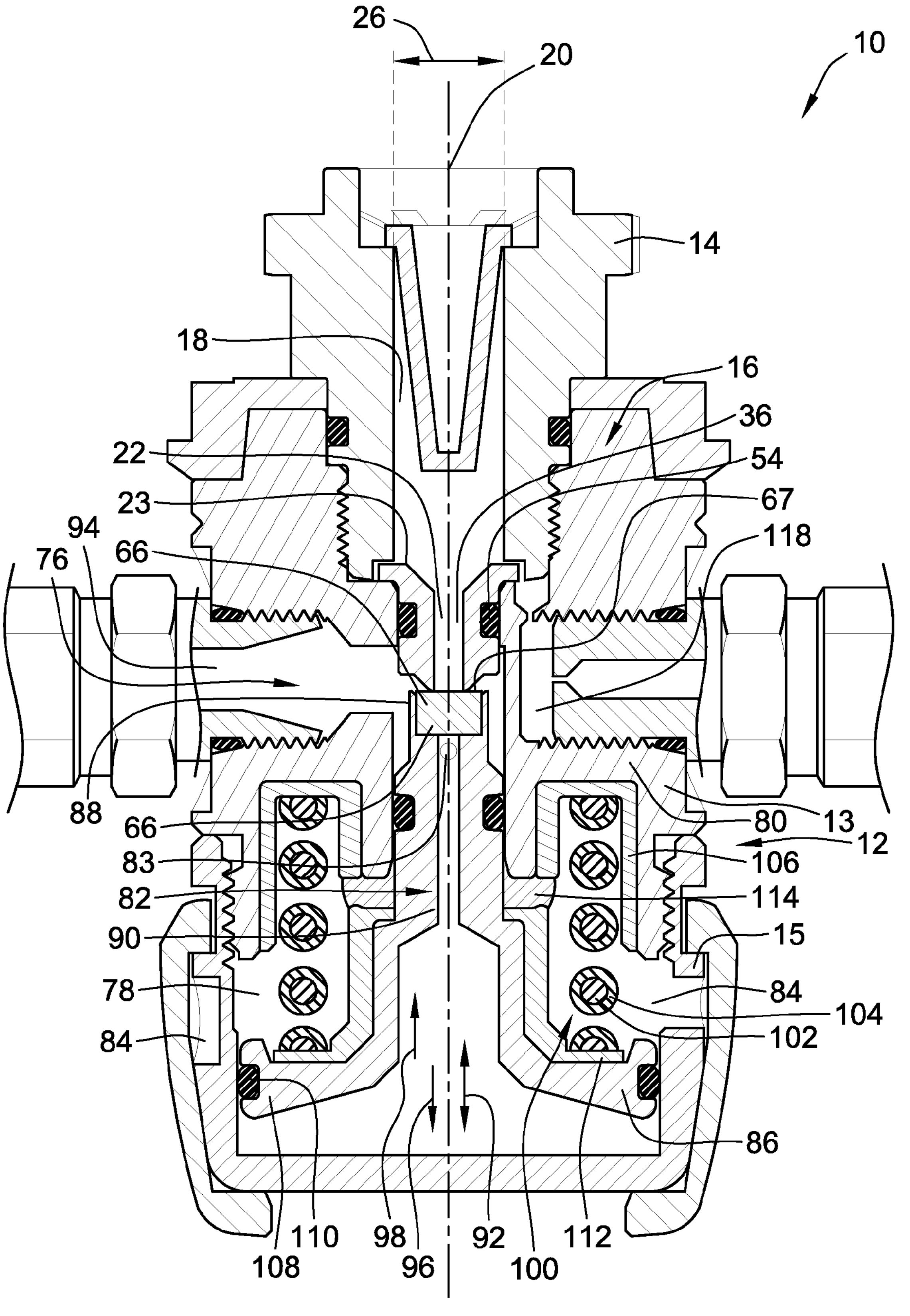
FIG. 1 illustrates an axial section of an embodiment of the pressure regulator valve according to the present invention with the valve member in a closed position.

FIG. 1 illustrates a first stage air pressure reduction valve 10 of a two stage system. The first stage air pressure reduction valve 10 may also be referred to as first stage pressure regulator 10 or even more simply as pressure regulator 10. The first stage pressure regulator 10 is used to reduce the pressure of high pressure gas stored, typically, in a tank carried by a diver to a more manageable pressure that is used by a second stage regulator that supplies breathing gas to the diver. Typically, the high pressure gas source approximates 4000 psi. The high pressure air is compressed air that may be a mixture of oxygen and other suitable gases for diving. For simplicity, hereinafter, the air or gas mixture will be referred to as gas.

The pressure regulator 10 generally includes a valve body 12. In the illustrated embodiment, the valve body 12 is generally a two piece valve body having two components 13 and 15 attached to one another. In this embodiment, the components 13 and 15 are threadedly connected to one another. The valve body 12 may be constructed of brass and coated in an anti-corrosion material such as chrome.

The valve body 12 is joined to a supply of compressed air (not shown), such as a cylinder of compressed air, by an inlet tubular union 14 attached to a high pressure inlet 16 of the valve body 12. As with the valve body 12, the inlet tubular union 14 may be made of brass and coated in an anti-corrosion material such as chrome. In this embodiment, the inlet tubular union 14 is threadedly connected to the high pressure inlet 16 of the valve body 12. The inlet tubular union 14 is a conduit having a center passage 18 surrounding a center axis 20 of the inlet tubular union 14. High pressure air flows from the cylinder through the center passage 18 and selectively into and through an orifice 22 of a removable high pressure orifice body 23. With additional reference to FIG. 2, the center passage 18 of the inlet tubular union 14 has a central portion of a first diameter 26 and a downstream portion 32 that includes an annular cavity 44 having a second diameter 34 that is greater than first diameter 26 formed by a stepped portion of the inner surface of inlet tubular union 14. The center passage 18 may be coaxial and concentric with a center axis 36 of the orifice 22 of the removable high pressure orifice body 23.

Figure 2:
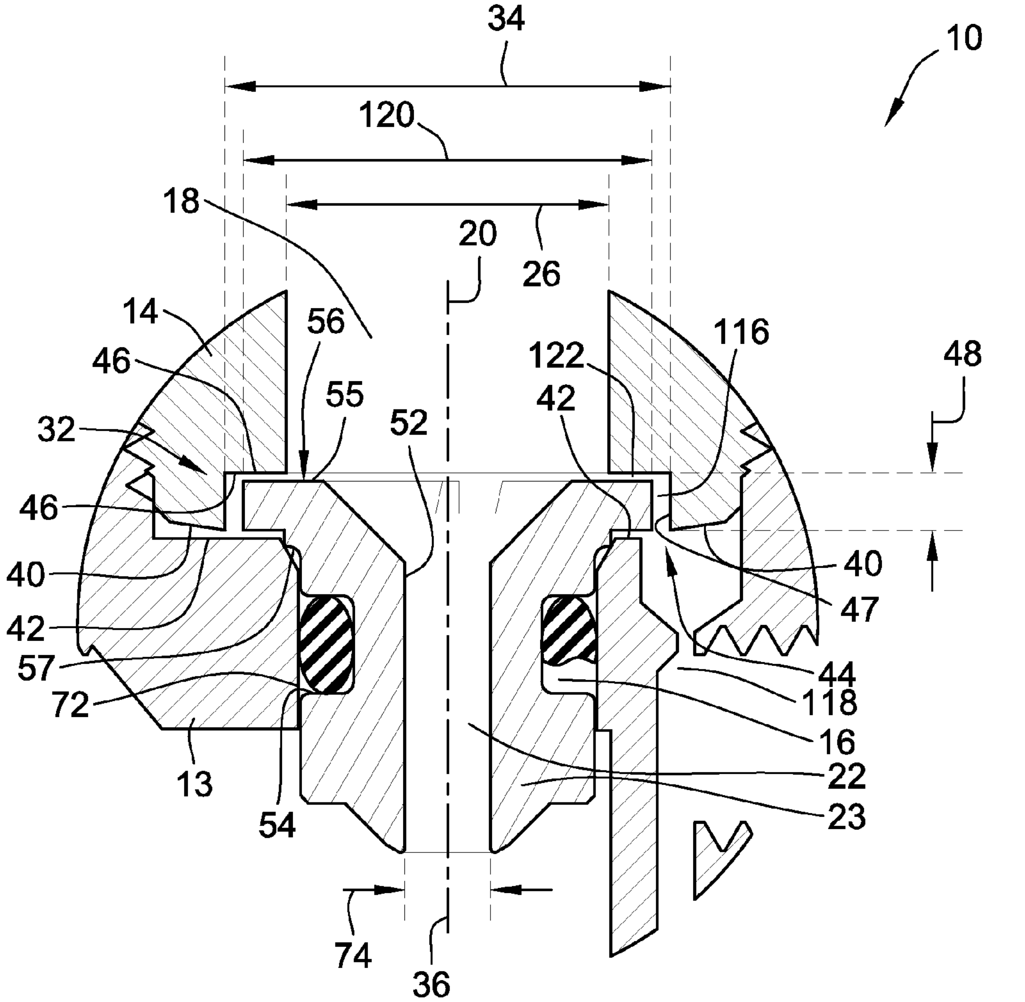
FIG. 2 illustrates an enlarged view of a downstream portion of an inlet tubular union of the pressure regulator of FIG. 1.

FIG. 2 illustrates an enlarged view of the downstream portion 32 of the inlet tubular union 14. The downstream portion 32 has an outermost surface 40 that forms a distal end of the tubular union 14 that may contact or simply come very near without contacting an axially outward facing surface 42 of the high pressure inlet 16 of the valve body 12. The annular cavity 44 is formed into the outermost surface 40 of the downstream portion 32 of the inlet tubular union 14. The annular cavity 44 is in the form of a cylindrical cavity having diameter 34 and having a smooth planer surface 46 and a sidewall 47 extending axially between surfaces 40 and 46. The depth 48 of the annular cavity 44 is defined as the distance from the surface 40 of the downstream portion 32 of the inlet tubular union 14 to the upstream surface 46 of the cavity 44 and corresponds to sidewall 47. In an embodiment, the depth 48 of the cavity 44 may be configured to seat orifice body 23 against component 13 of the valve body 12 and thereby fix the orifice body 23 between the inlet tubular union 14 and the valve body 12. In another embodiment, the cavity 44 is spaced upstream of surface 42 far enough to permits the orifice body 23 to move axially within the cavity 44 with surface 40 and 46 acting as stops to limit the axial movement of the orifice body 23.

Thus, the depth 48 of the cavity 44 of the inlet tubular union is such that a T-shaped head 52 of the removable high pressure orifice body 23 is received into the cavity 44 and is sandwiched between the planar surface 46 of the cavity 44 of the inlet tubular union 14 and the valve body 12. More specifically, a top surface 55 (FIG. 3) of the T-shaped head 52 may be in contact with the bottom surface 46 of the inlet tubular union 14 while the orifice body 23 is in axial contact with and thus seated upon valve body 12. A slot 53 (FIG. 3) is formed into the top surface 55 of the T-shaped head 52.

The slot 53 provides a means by which high pressure air in the center passage 18 of the inlet tubular union 14 fluidly communicates with a high pressure passage 116 when the planar surface 46 of the inlet tubular union is in contact with the top surface 55 of the T-shaped head 52. The fluid communication is possible because the diameter 120 of the T-shaped head is less than the diameter 34 of the cavity 44 and thus an annular high pressure passage 116 is formed that surrounds the T-shaped head and fluidly communicates with a high pressure exit port 118 of the valve body 12. The high pressure exit port 118 may permit a high pressure gauge to attach to the valve body 12 via the exit port 118 to enable a diver to read the pressure of the tank (not shown) containing the high pressure air.

In another embodiment, as shown in FIG. 2 planar surface 46 of the cavity is not in contact with the top surface 55 of the T-shaped head and thus the orifice body 23 is free to move in an axial direction and is thus held in place against the valve body by the high pressure air in contact with the top surface 55 of the T-shaped head. It can be readily appreciated that the axial movement of the orifice body 23 is not without limits, that is, the planar surface 46 acts as a stop for limiting the axial movement of the orifice body 23. In this embodiment it is the high pressure gas acting against the orifice body 23 that seats the orifice body 23 against the valve body 12. In this embodiment a gap 122 is created between planar surface 46 and top surface 55. The gap 122 is in fluid communication with the annular high pressure passage 116 which in turn, as previously discussed is in fluid communication with the high pressure exit port 118 of the valve body 12.

The inlet tubular union 14 may be threadily received into the high pressure inlet 16 of the valve body 12 and over the top surface 55 of the T-shaped head 52. Although, threading is shown, it is not the intent to limit reception by threading as other fastening means may be used. Thus, it can be readily appreciated that insertion of the removable high pressure orifice body 23 takes place prior to threading the inlet tubular union 14 into the high pressure inlet 16 of the valve body 12. The fastening of the inlet tubular union 14 to the high pressure inlet 16 of the valve body 12 easily secures the removable high pressure orifice body 23 between the inlet tubular union 16 and the valve body 12 during assembly. More specifically, the T-shaped head 52 of the high pressure orifice body 23 is received into the cavity 44 of the inlet tubular union 14 as the inlet tubular union 14 is threaded, as shown in this embodiment, into the high pressure inlet 16 of the valve body 12. Further, during disassembly of the regulator 10 one need only to unthread the inlet tubular union 14 from the high pressure inlet 16 of the valve body 12 in order to access the removable high pressure orifice 22. Once the inlet tubular union 14 is removed from the inlet 16, the removable high pressure orifice body 23 can be easily removed from the inlet 16. The removal may be done, for example, by a simple grasp and light pull of the T-shaped head 52 and/or simply allowing gravity to let the removable high pressure orifice body 23 to fall from the inlet 16.

The removable high pressure orifice body 23 provides for less complex machining processes with respect to forming the valve body 12 (or the inlet tubular union 14). Heretofore, a high pressure orifice was machined as part of the valve body 12 (or inlet tubular union 14). Such machining can be readily understood to be more complex and time consuming than a valve body 12 (or inlet tubular union 14) that does not have an integral high pressure orifice.

Because the orifice 22 is no long machined into the valve body 12 an embodiment of the removable high pressure orifice 22 may provide for a removable high pressure orifice body 23 made of a material of a first hardness while the valve body 12 may be made of material of a second hardness. In a preferred embodiment, the first hardness may be greater than the second hardness. For a non-limiting example, the high pressure orifice 22 may be made of stainless steel while the valve body 12 may be made of nickel-brass. Because the removable high pressure orifice body 23 may be of a greater hardness than the valve body 12, sealing edges 28 of the removable high pressure orifice body 23 will wear more slowly than mating surfaces of the valve body 12.

The removable high pressure orifice body 23 defines orifice 22 that receives high pressure air from the center passage 18 of the inlet tubular union 14. The central orifice 22 of the removable high pressure orifice body 23 has a diameter 74 that is less than the diameter 26 of the center passage 18 of the inlet tubular 14 and thus acts as a flow restriction. In an embodiment the diameter 74 of the orifice 22 of the removable high pressure orifice body 23 may be between 1 and 4 mm. In a preferred embodiment the diameter of the orifice may be between 1.5 mm and 3 mm and in a more preferred embodiment the diameter 74 may be between 1.9 mm and 2.1 mm.

The replaceable high pressure orifice body 23 as heretofore described has shown the unexpected result of as much as 15% increased airflow through the pressure regulator valve 10 as compared to similar pressure regulator valves having a high pressure orifice integral with the valve body 12.

Further, by providing a removable high pressure orifice body 23 the valve body 12 and the inlet tubular union 14 can more easily be protected from corrosion. In a preferred embodiment, the high pressure inlet 16 of the valve body 12 and the inner surface of the inlet tubular union 14 are smooth as opposed to inner surfaces having threads or other internal grooves. This presents an advantage because smooth continuous surfaces are more easily protected from corrosion with anti-corrosion coatings than are those with threads or grooves that are difficult to coat.

Still further, with such a readily removable high pressure orifice body 23 quality control of the removable high pressure orifice 22 may be done independently of the valve body itself 12 and thus results in more precise and timely quality control as opposed to an orifice integral with the valve body 12. Such a removable high pressure orifice body 23 saves repair costs where, for example, the entire valve body 12 (or inlet tubular union 14) has to be re-machined upon a machining error or upon wear of a high pressure orifice integral thereto. The ease of removing the replaceable high pressure orifice body 23 allows for simply replacing the high pressure orifice body 23 when worn or re-machining the high pressure orifice body 23 or simply replacing an annular radial seal 54 of the high pressure orifice body 23.

Figure 3:
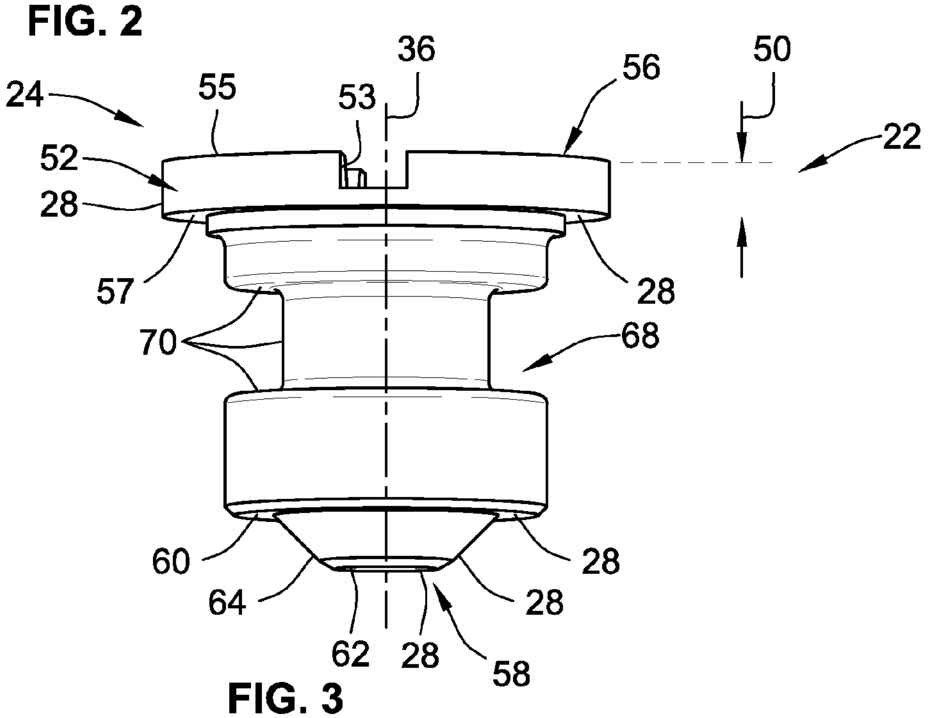
FIG. 3 illustrates an elevated perspective view of a removable high pressure orifice body of the pressure regulator of FIG. 1.

Turning now to FIG. 3, the removable high pressure orifice body 23 as was discussed above, has a T-shaped head 52 having a slot 53 at an upstream end 56. The T-shaped head 52 provides the means by which the removable high pressure orifice body 23 mates with the valve body 12 and is received into the cavity 44 of the inlet tubular union 14. (See FIGS. 1 and 2) At a downstream end 58 of the removable high pressure orifice body 23 there is an annular planar flange 60 and a conical protrusion 64 that mates with and is received by corresponding surfaces 67 of valve seat 66 (FIG. 1). An annular groove 68 is provided in approximately the axial center of removable high pressure orifice body 23. Axial is to be understood in this context as between the upstream end 56 of the removable high pressure orifice body 23 and the downstream end 58 of the removable high pressure orifice body 23 and corresponds to central axis 36. The annular groove 68 provides sealing and bearing surfaces 70 for the annular radial seal 54 carried therein. The annular radial seal 54 also bears against and seals with an annular interior wall 72 (FIG. 2) of the high pressure inlet 16 of the valve body 12 so as to prevent any gas or liquid from bypassing orifice 22.

Turning again to FIG. 1, the valve body 12 provides a pressure chamber 76 and a compensation chamber 78. The pressure chamber 76 and compensation chamber 78 may be concentric and coaxial. The pressure chamber 76 and compensation chamber 78 are separated from one another by a partition wall 80 and a valve member 82 that is movable.

The pressure chamber 76 communicates via the inlet tubular union 14 and orifice 22 of the removable high pressure orifice body 23 with the pressurized gas supplied into the pressure regulator 10 from the cylinder of compressed gas. The compensation chamber 78 communicates with the outside ambient water through openings 84 in the valve body 12. During a dive, the compensation chamber 78 fills with water at a pressure corresponding to the dive depth.

The valve member 82 is slidingly carried within the valve body 12. The valve member 82 has an expansion head 86 that is connected to a valve end 88 by a tubular stem 90. The tubular stem 90 and expansion head 86 are both sealed to the valve body 12 to prevent ingress of ambient water or egress of the gas within the regulator. The tubular stem 90 and expansion head 86 are also allowed to slide axially within the valve body 12 as illustrated by arrow 92 so as to allow the pressure regulator 10 to reduce the pressure of the gas from its inlet pressure.

The tubular stem 90 is preferably a metal material such as stainless steel to ensure a better resistance both mechanically and chemically (saline, etc.). In this embodiment, the tubular stem 90 defines the valve end 88.

The valve end 88 is shaped to carry valve seat 66. The valve end 88 carrying valve seat 66 selectively seats against the distal end of the tapered protrusion 64 of the removable high pressure orifice body 23. When the valve end 88 is spaced away from valve seat 66, the pressure regulator 10 is in an open state and gas is allowed to flow through the orifice 22 to outlet 94 of the valve body 12 and into the tubular stem 90 through passage 83. This configuration is illustrated in FIG. 1. When the valve end 88 is biased against the distal end of the tapered protrusion 64, the fluid flow path from the inlet tubular union 14 through the orifice 23 of the removable high pressure orifice body 23 is closed preventing fluid flow.

The valve seat 66 is preferably of a non-metallic material so as to provide a good sealing engagement with the valve end 88 and the distal end of the tapered protrusion 64 of the removable high pressure orifice body 23 when the valve member 22 is in a closed state.

The expansion head 86 is at an end opposite valve end 88 of the valve member 82 and has an enlarged conical shape. Gas passes from the pressure chamber 76 into passage 83, through the tubular stem 90 and into the enlarged area provided by the conical shape of the expansion head 86. This conical shape provides an enlarged area in which the gas is allowed to expand. The exterior surfaces of the expansion head are acted on by the water within the compensation chamber 78 to bias the valve member 82 toward the open state (e.g. in the direction of arrow 96). The interior surfaces of the expansion head 86 are acted on by the gas sealed within the pressure regulator 10 to bias the valve member 82 towards the closed state (e.g. in the direction of arrow 98).

A coil spring 100 is located within the compensation chamber 78 to bias the valve member 82 toward the open state (e.g. in the direction of arrow 96) with a minimum predetermined amount of force. The coil spring 100 is interposed between the expansion head 86 and the valve body 12, and particularly a portion of the partition wall 80. The coils of the spring 100, in this embodiment, are formed by a stainless steel core 102 covered by a thermal insulating material layer 104.

As gas flows from orifice 22 to the outlet 94 and through the valve member 82, the gas is allowed to expand and drop in pressure. This expansion and pressure drop is an endothermic process that draws heat energy out of the components of the pressure regulator 10 that surround the pressure chamber 76, such as the valve body 12 and the valve member 82.

Because of the endothermic gas expansion, the compensation chamber 78 is subjected to a temperature drop which can cause freezing of the water within the compensation chamber 78. Ice formation within the compensation chamber 78 can affect the operation of coil spring 100, valve member 82 or the openings 84 and inhibit the pressure compensation feature of the pressure regulator 10.

One particular location where freezing occurs is proximate the end of the coil spring 100 that is pressed against the valve body 12. To address the freezing problems within the compensation chamber 78, the illustrated embodiment includes a thermally insulated bushing 106 that covers the outer surfaces of the valve body 12 proximate the location where the coil spring 100 is supported.

The thermally insulated bushing 106 is preferably made of thermal insulating plastic material, which can also include a suitable filling material, such as for instance empty microspheres embedded in the plastic to improve the thermal insulation and inhibit heat transfer from the water within the compensation chamber to the valve body 12 and pressure regulator 10, generally.

Additional insulation may be provided by thermally insulating with an insulating sleeve 112 the expansion head 86 surfaces acted upon by the water. Still more insulation may be provided by insulating the external surfaces exposed to water of the valve stem 90 with both the sleeve 112 and an insulating ring 114 that surrounds a portion of tubular stem 90. The insulating sleeve 112 and insulating ring 114 in a non-limiting embodiment are of the same material as that discussed above with respect to insulated bushing 106. An annular part 108 of the expansion head 86 carries on its outer radial periphery a watertight ring (O-ring) 110.

The surfaces exposed to the ambient water (also referred to as the "wet area") of compensation chamber 78 are substantially insulated, e.g. formed from an insulating material. In some embodiments, more than 80% of the surfaces in compensation chamber 78 are insulated and in yet other embodiments at least 90% of the surfaces in compensation chamber 18 are insulated. Because of the thermally insulated means heretofore discussed, heat transfer from the water within the compensation chamber 78 is reduced which inhibits freezing of the water within the pressure compensation chamber 78 during cold water dives, at least for the length of time of a normal diving, thus avoiding the inefficiency or the eventual valve blocking and the associated risks for the user.

The invention provides a method of servicing the first stage pressure regulator 10. The method includes removing a removable high pressure orifice body 23 from an inlet 16 of the valve body 12. The removal may be, as a non-limiting example unthreading the inlet tubular union 14 from the valve body 12 and allowing gravity to let the removable high pressure orifice body 23 to drop from valve body 12. The removable high pressure orifice may then be modified by machining or simply replacing the entire removable high pressure orifice body 23 with a new orifice body.

As can be readily appreciated, the orifice diameter 74 of the original orifice body 23 that has worn may be machined to a greater diameter or simply cleaned so as to retain the original orifice diameter 74. The sealing surfaces of the orifice body may be machined or cleaned as well and as previously discussed the annular seal 54 may be replaced.

On the other hand, as discussed, modifying may mean the orifice body 23 is replaced with a second orifice body, that is, a new orifice body. In that case, the orifice diameter may equal the diameter 74 of the original orifice 22 or the orifice diameter may have a smaller diameter or greater diameter and thereby provide for an orifice diameter of a flow restriction different than the original orifice 22.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A first stage pressure regulator comprising:

a valve body having an inlet and an outlet and defining a pressure chamber between the inlet and the outlet, the valve body defining a pressure compensation chamber having an opening fluidly communicating the pressure compensation chamber with surrounding water;

an inlet tubular union removably received into the inlet;

a removable high pressure orifice body defining an orifice therethrough, the orifice body carried by the valve body proximate the inlet, the removable high pressure orifice body having a T-shaped head;

a valve seat within the valve body;

a valve member slidably carried within the valve body pressure chamber having a valve end, the valve seat being carried by the valve end, the valve member slidable between an open state in which the valve end carrying the valve seat is spaced from the removable high pressure orifice body permitting fluid flow through the orifice between the inlet and outlet and a closed state in which the valve end carrying the valve seat is sealingly seated against the removable high pressure orifice body preventing fluid flow between the inlet and outlet; and wherein the removable high pressure orifice body has an upstream end in the form of a T-shaped head having a larger diameter than a downstream end.

2. A first stage pressure regulator comprising:

a valve body having an inlet and an outlet and defining a pressure chamber between the inlet and the outlet, the valve body defining a pressure compensation chamber having an opening fluidly communicating the pressure compensation chamber with surrounding water;

an inlet tubular union removably received into the inlet;

a removable high pressure orifice body defining an orifice therethrough, the orifice body carried by the valve body proximate the inlet, the removable high pressure orifice body having a T-shaped head;

a valve seat within the valve body;

a valve member slidably carried within the valve body pressure chamber having a valve end, the valve seat being carried by the valve end, the valve member slidable between an open state in which the valve end carrying the valve seat is spaced from the removable high pressure orifice body permitting fluid flow through the orifice between the inlet and outlet and a closed state in which the valve end carrying the valve seat is sealingly seated against the removable high pressure orifice body preventing fluid flow between the inlet and outlet; and wherein a bottom surface of the T-shaped head is seated upon outward facing surface of the inlet of the valve body; a top surface of the T-shaped head in contact with the inlet tubular union such that the inlet tubular union secures the orifice body in the inlet.

3. The first stage pressure regulator of claim 2, wherein the T-shaped head fits inside a cavity at a distal end of the inlet tubular union, and wherein the T-shaped head includes a slot that fluidly communicates a high pressure passage surrounding the T-shaped head with a center passage of the inlet tubular union; the high pressure passage in fluid communication with a high pressure exit port of the valve body.

4. The first stage pressure regulator of claim 1, wherein a head of the removable high pressure orifice body is inside a cavity formed in a distal end of the inlet tubular union.

5. A first stage pressure regulator comprising:

a valve body having an inlet and an outlet and defining a pressure chamber between the inlet and the outlet, the valve body defining a pressure compensation chamber having an opening fluidly communicating the pressure compensation chamber with surrounding water;

an inlet tubular union removably received into the inlet;

a removable high pressure orifice body defining an orifice therethrough, the orifice body carried by the valve body proximate the inlet;

a valve seat within the valve body;

a valve member slidably carried within the valve body pressure chamber having a valve end, the valve seat being carried by the valve end, the valve member slidable between an open state in which the valve end carrying the valve seat is spaced from the removable high pressure orifice body permitting fluid flow through the orifice between the inlet and outlet and a closed state in which the valve end carrying the valve seat is sealingly seated against the removable high pressure orifice body preventing fluid flow between the inlet and outlet; and wherein a T-shaped head of the high pressure orifice body is dimensioned to fit within a cavity of the inlet tubular union.

6. The first stage pressure regulator of claim 5, wherein the orifice body is axially movable and the inlet tubular union limits axial motion of the orifice body.

7. The first stage pressure regulator of claim 1, wherein an end of the removable high pressure orifice body is in sealing contact with the valve seat in the closed state.

8. The first stage pressure regulator of claim 1, wherein the valve body comprises a material of a first hardness and the removable high pressure orifice is comprised of a material of a second hardness greater than the first hardness.

9. A first stage pressure regulator comprising:

a valve body having an inlet and an outlet and defining a pressure chamber between the inlet and the outlet, the valve body defining a pressure compensation chamber having an opening fluidly communicating the pressure compensation chamber with surrounding water;

an inlet tubular union removably received into the inlet;

a removable high pressure orifice body defining an orifice therethrough, the orifice body carried by the valve body proximate the inlet;

a valve seat within the valve body;

a valve member slidably carried within the valve body pressure chamber having a valve end, the valve seat being carried by the valve end, the valve member slidable between an open state in which the valve end carrying the valve seat is spaced from the removable high pressure orifice body permitting fluid flow through the orifice between the inlet and outlet and a closed state in which the valve end carrying the valve seat is sealingly seated against the removable high pressure orifice body preventing fluid flow between the inlet and outlet; and wherein the removable high pressure orifice body generally includes: a T-shaped head at an upstream end; a conical protrusion at a downstream end; a slot formed into a top surface of the T-shaped head; an annular groove formed into the valve body proximate an axial center of the orifice body.

10. The first stage pressure regulator of claim 9, wherein the annular groove receives an O-ring; the O-ring in sealing contact with walls of the inlet of the valve body.

11. The first stage pressure regulator of claim 9, wherein the conical protrusion of the removable high pressure orifice terminates at a tip; the tip in sealing contact with the valve seat in the closed state.

12. A first stage pressure regulator comprising:

a valve body having an inlet and an outlet and defining a pressure chamber between the inlet and the outlet, the valve body defining a pressure compensation chamber having an opening fluidly communicating the pressure compensation chamber with surrounding water;

an inlet tubular union removably received into the inlet;

a removable high pressure orifice body defining an orifice therethrough, the orifice body carried by the valve body proximate the inlet;

a valve seat within the valve body;

a valve member slidably carried within the valve body pressure chamber having a valve end, the valve seat being carried by the valve end, the valve member slidable between an open state in which the valve end carrying the valve seat is spaced from the removable high pressure orifice body permitting fluid flow through the orifice between the inlet and outlet and a closed state in which the valve end carrying the valve seat is sealingly seated against the removable high pressure orifice body preventing fluid flow between the inlet and outlet; and wherein the removable high pressure orifice is free of fastening threads.

13. The first stage pressure regulator of claim 1, wherein the orifice body extends downstream of the T-shaped head into the inlet.

14. A first stage pressure regulator comprising:

a valve body having an inlet and an outlet and defining a pressure chamber between the inlet and the outlet, the valve body defining a pressure compensation chamber having an opening fluidly communicating the pressure compensation chamber with surrounding water;

an inlet tubular union removably received into the inlet;

a removable high pressure orifice body defining an orifice therethrough, the orifice body carried by the valve body proximate the inlet;

a valve seat within the valve body;

a valve member slidably carried within the valve body pressure chamber having a valve end, the valve seat being carried by the valve end, the valve member slidable between an open state in which the valve end carrying the valve seat is spaced from the removable high pressure orifice body permitting fluid flow through the orifice between the inlet and outlet and a closed state in which the valve end carrying the valve seat is sealingly seated against the removable high pressure orifice body preventing fluid flow between the inlet and outlet; and comprising within the compensation chamber: an insulated bushing; an insulating ring; an insulating sleeve and an insulated biasing member.

* * * * *